(12) United States Patent
Kaliyamoorthy et al.

(10) Patent No.: US 10,075,369 B2
(45) Date of Patent: Sep. 11, 2018

(54) SYSTEMS AND METHODS FOR IMPROVED SWITCH PERFORMANCE BY PREVENTING FLOODING

(71) Applicant: DELL PRODUCTS L.P., Round Rock, TX (US)

(72) Inventors: Karthi Kaliyamoorthy, Villupuram (IN); Rajesh Balachandran, Kallepully (IN)

(73) Assignee: DELL PRODUCTS LP, Round Rock, TX (US)

( * ) Notice: Subject to any disclaimer, the term of this patent is extended or adjusted under 35 U.S.C. 154(b) by 69 days.

(21) Appl. No.: 14/697,241

(22) Filed: Apr. 27, 2015

(65) Prior Publication Data
US 2016/0315851 A1    Oct. 27, 2016

(51) Int. Cl.
*H04L 12/721* (2013.01)
*H04L 12/761* (2013.01)
*H04L 12/741* (2013.01)
*H04L 12/751* (2013.01)
*H04L 12/931* (2013.01)

(52) U.S. Cl.
CPC ............. *H04L 45/32* (2013.01); *H04L 45/02* (2013.01); *H04L 45/08* (2013.01); *H04L 45/16* (2013.01); *H04L 45/66* (2013.01); *H04L 45/745* (2013.01); *H04L 49/351* (2013.01)

(58) Field of Classification Search
CPC ... H04L 49/351; H04L 49/3009; H04L 12/46; H04L 41/12; H04L 45/00; H04L 12/462; H04L 12/4641; H04L 61/00; H04L 45/32; H04L 45/16; H04L 45/66; H04L 45/745; H04L 45/02; H04L 45/08
See application file for complete search history.

(56) References Cited

U.S. PATENT DOCUMENTS

| | | | |
|---|---|---|---|
| 9,007,955 B1 * | 4/2015 | Kienzle | H04L 41/12 370/254 |
| 2008/0049764 A1 * | 2/2008 | Solomon | H04L 12/66 370/401 |
| 2010/0085982 A1 * | 4/2010 | Martinotti | H04L 12/462 370/420 |
| 2010/0271980 A1 * | 10/2010 | Kini | H04L 12/462 370/256 |
| 2012/0063306 A1 * | 3/2012 | Sultan | H04L 12/4625 370/230 |
| 2016/0057054 A1 * | 2/2016 | Lumezanu | H04L 45/48 370/256 |

OTHER PUBLICATIONS

Stretch et al., "Blocking Unknown Unicast Flooding", Jun. 4, 2010 to Mar. 2, 2015, PacketLife.net, http://packetlife.net/blog/2010/jun/4/blocking-unknown-unicast-flooding/.*

(Continued)

*Primary Examiner* — Paul H Masur
*Assistant Examiner* — Michael K Phillips
(74) *Attorney, Agent, or Firm* — North Weber & Baugh LLP

(57) ABSTRACT

Aspects of the present invention include directing traffic in data communications systems. In embodiments of the present invention the traffic is directed based on a Media Access Control (MAC) address table. In embodiments of the present invention traffic directed to an unknown port is blocked to all ports that are in the MAC address table.

19 Claims, 4 Drawing Sheets

(56) References Cited

OTHER PUBLICATIONS

Cisco, "Flooding vs Broadcast", Dec. 10, 2009, Cisco Support Community, https://supportforums.cisco.com/t5/lan-switching-and-routing/flooding-vs-broadcast/td-p/1369127.*
Cisco, printed from the internet: URL: http://www.cisco.com/c/en/us/td/docs/switches/lan/catalyst4500/12-2/31sg/configuration/guide/conf.
Software Configuration Guide-Release 12.2(31)SG, OL-8881-01, Chapter 37, "Port Unicast and Multicast Flood Blocking," pp. 37-1-37-4.

* cited by examiner

SYSTEMS AND METHODS FOR IMPROVED SWITCH PERFORMANCE BY PREVENTING FLOODING

BACKGROUND

Field of Invention

The present invention relates generally to data communication networks and devices, and relates more particularly to switch performance in data communications networks.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One method used to improve reliability is to provide redundant links between network devices. By employing redundant links, network traffic between two network devices that would normally be interrupted can be re-routed to the back-up link in the event that the primary link fails.

Although having redundant links is helpful for failover situations, it creates network loops, which can be fatal to networks. To remove the loops, a protocol named Spanning Tree Protocol (STP) is often employed. STP is a Layer-2 protocol that runs on network devices, such as bridges and switches, to ensure that loops are not created when there are redundant paths in the network. The result of the STP is that some links are inactive unless a primary link fails. Thus, networks using redundant links with STP have links that are underutilized.

FIG. 1 depicts an example of a networking system 100 that employs Spanning Tree Protocol. Depicted in FIG. 1 is a set of networking devices 105A-105D that are connected to other networks devices 110A and 110B (which may be access switches), which are in turn connected to other network devices 115A and 115B (which may be core switches or routers). The network devices are connected with redundant links. Due to STP, some of the links are active 120 and some of the links are placed into an inactive state 125 to avoid network loops. Because many of the links are placed into an inactive state by the STP, the network capacity is underutilized. To address the limitations of STP, a protocol called the multiple spanning tree protocol (MSTP) was developed by IEEE 802.1 [IEEE 802.1s]. While this protocol allows for more links to be used for forwarding, it still suffers from the limitation of having a loop-free active topology for any given VLAN.

However, ever increasing demands for data have required communication networks to provide more throughput. Not only must networks be reliable, but they must also provide adequate bandwidth. Thus, an area in which communication networks strive to improve is in increasing capacity (data throughput or bandwidth).

One way to increase capacity through recapturing unused network capacity involves improving the performance of Layer 2 switches. Layer 2 switches (L2 switches) are often used for high speed connectivity between end devices such as a router, server, or user PC at the data link layer. In the prior art L2 switches, whenever an L2 switch receives a frame with an unknown destination Media Access Control (MAC) address will be forwarded to all MAC addresses, which leads to unnecessary bandwidth consumption and buffer utilization on the switch and connected end devices.

One disadvantage of the present system is that bandwidth consumption is inefficient.

Accordingly, what is needed are systems and methods that can address the deficiencies and limitations of the current L2 switching protocols.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

Figure 1:
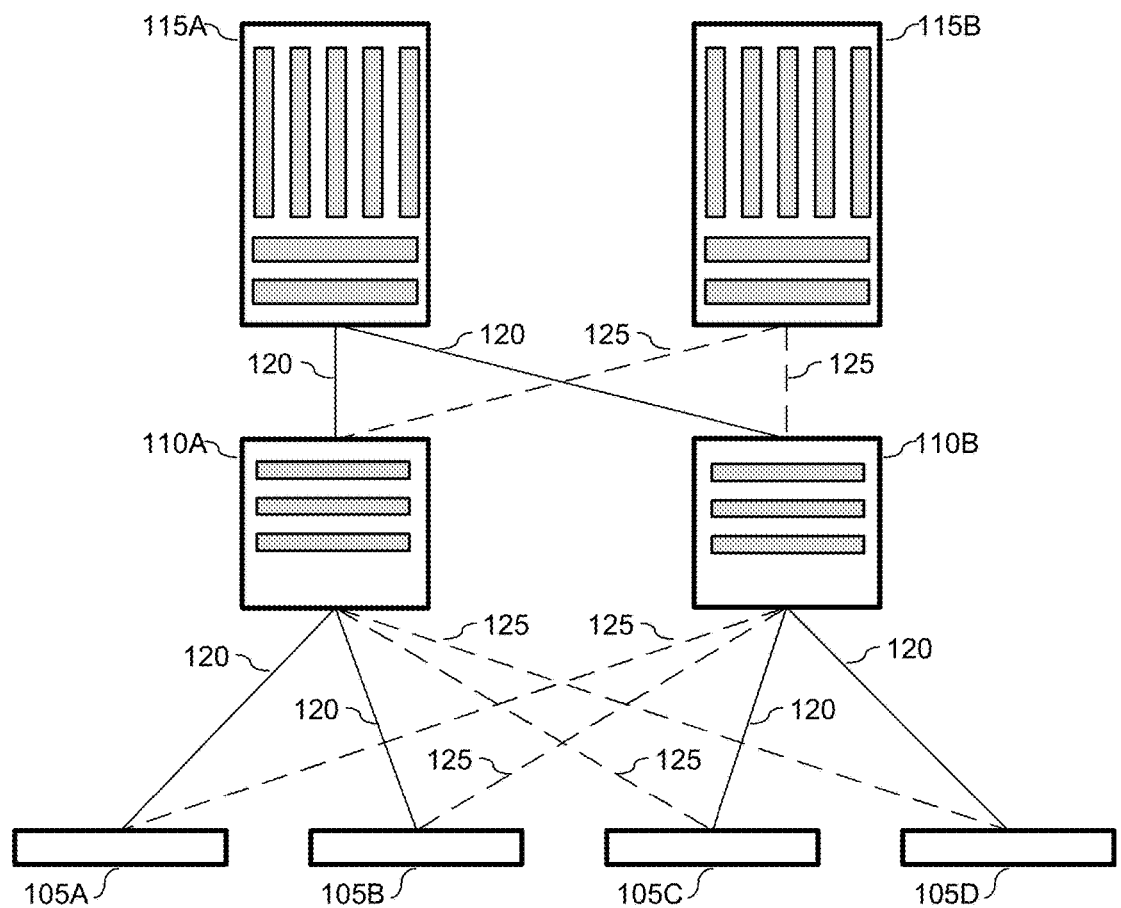
FIG. 1 depicts an example of a networking system that employs Spanning Tree Protocol.

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the ability to deploy power measurement on a component level in a live network or to design network devices.

It shall also be noted that although embodiments described herein may be within the context of power consumption in a network device, the invention elements of the current patent document are not so limited. Accordingly, the invention elements may be applied or adapted for use in other contexts.

Current implementations of switches require L2 flooding to initiate communication between two ports. Each port can be connected to an end device. End devices include a server, Personal Computer (PC), and a router. For example, if one PC wants to communicate with another PC on a different port, many other ports may be flooded with the communication.

Figure 2:
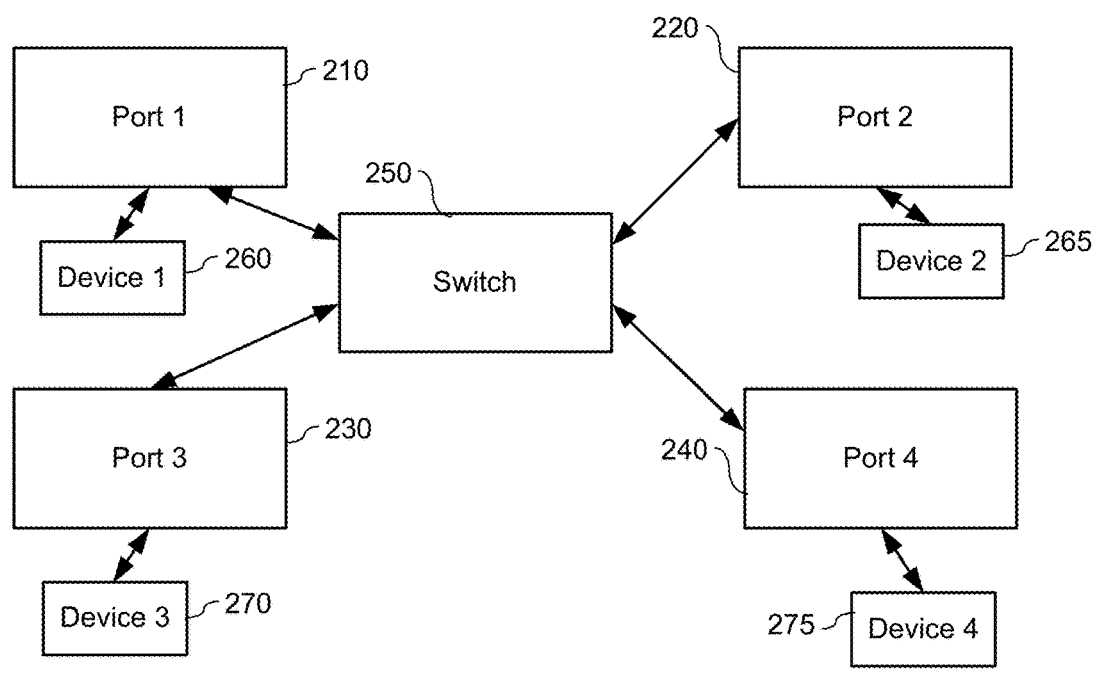
FIG. 2 depicts a block diagram showing a switch with four ports according to embodiments of the present invention.

FIG. 2 depicts a block diagram showing a switch with four ports according to embodiments of the present invention. FIG. 2 shows system 200 including switch 250 having port 1 210, port 2 220, port 3 230, and port 4 240, and device 1 260, device 2 265, device 3 270, and device 4 275. If device 1 260 connected to port 1 210 sends traffic to device 2 265 connected to port 2 220, an Address Resolution Protocol (ARP) is initiated from port 1 210 to find the MAC address of port 2 220 connected device. The source MAC address of port 1 210 can be registered at a MAC address table. The port 2 220 connected device 265 replies ARP with its own MAC address. The source address of port 2 220 can be registered at the MAC address table. When traffic is initiated from port 1 210 to port 2 220 MAC address, traffic will be unicast to port 2 220. However, when port 3 230 initiates traffic towards port 4 240 connected devices, each of the above steps is repeated for port 3 230 and port 4 240. Currently, there is a 300 second timer as well. So if port 3 230 stops sending traffic to port 4 240 for more than 300 seconds the MAC addresses of port 3 230 and port 4 240 are cleared from the MAC address table. Thus, when traffic resumes there is no learned MAC addresses in the switch.

If port 3 230 traffic has become unknown unicast traffic and once again received at port 1 210, port 2 220 and port 4 240 due to L2 flooding there is unnecessary performance impact and buffer usage on both the switch and the connected end devices.

Furthermore, each end device has to process the unknown unicast packets and then drop if it does not apply to that end device. This processing can create a delay in processing the destined unicast traffic due to congestion since the device can receive known and unknown traffic simultaneously.

When receiving traffic in real time, it is not possible to completely block unknown unicast traffic.

In embodiments of the present invention, some traffic is blocked, thereby saving on processing and bandwidth. Each switch 250 maintains a MAC address table having MAC addresses that have been previously learned and remembered. In embodiments of the present invention, the switch will not forward received unknown unicast traffic to ports residing the same broadcast domain for which the MAC address of the connected end devices are already learned in the MAC address table. As MAC addresses expire in a real time scenario this embodiment improves performance of both the switch and connected end devices.

FIG. 2 can be used to describe one example of traffic flow using embodiments of the present invention. One of ordinary skill in the art will understand that the example used is exemplary and not intending to be limiting or the only example. For example, a port 1 210 connected device 260 intends to initiate traffic to communicate with a port 2 220 connected device 265. An ARP can be initiated from port 1 210 to find the MAC address of the port 2 220 connected device. When the request is initiated, the MAC address of the port 1 210 device is entered in the MAC address table in switch 250. The port 2 220 connected device 265 replies with its MAC address. That MAC address can be learned and stored in the MAC address table in switch 250. When traffic initiated from port 1 210 with the port 2 220 MAC address, traffic will be unicast to only port 2 220.

When port 3 230 initiates traffic to port 4 240 connected devices 275, all the above steps would be repeated for ports 3 230 and 4 240. An ARP can be initiated from port 3 230 to find the MAC address of the port 4 240 connected device 275. When the request is initiated, the MAC address of the port 3 230 device 270 is entered in the MAC address table in switch 250. The port 4 240 connected device 275 replies with its MAC address. That MAC address is learned and stored in the MAC address table in switch 250. When traffic initiated from port 3 230 with the port 4 240 MAC address, traffic will be unicast to only port 4 240.

If port 3 230 stops sending traffic for port 4 240 for more than 300 seconds, the MAC addresses of port 3 230 and port 4 240 are cleared from the MAC address table as the timer expires.

If traffic re-initiates from port 3 230 to port 4 240 (after 300 seconds) there is no ARP request initiated, since the ARP cache typically times out after 4 hours, and there is no MAC learning in the switch. However, in embodiments of the present invention, the traffic from port 3 230 to port 4 240 will not be send to port 1 210 or port 2 220 since their connected devices MAC addresses are already present in the MAC address table. Therefore, in this example, the traffic initiated from port 3 230 to port 4 240 would be forwarded to only port 4 240 instead of broadcast to all ports.

This blocking of traffic avoids L2 flooding on port 1 210 and port 2 220 on the switch side and stops unnecessary bandwidth consumption and interface buffer utilization. Also, the processing is improved since known destined end devices are not receiving unknown traffic.

Figure 3:
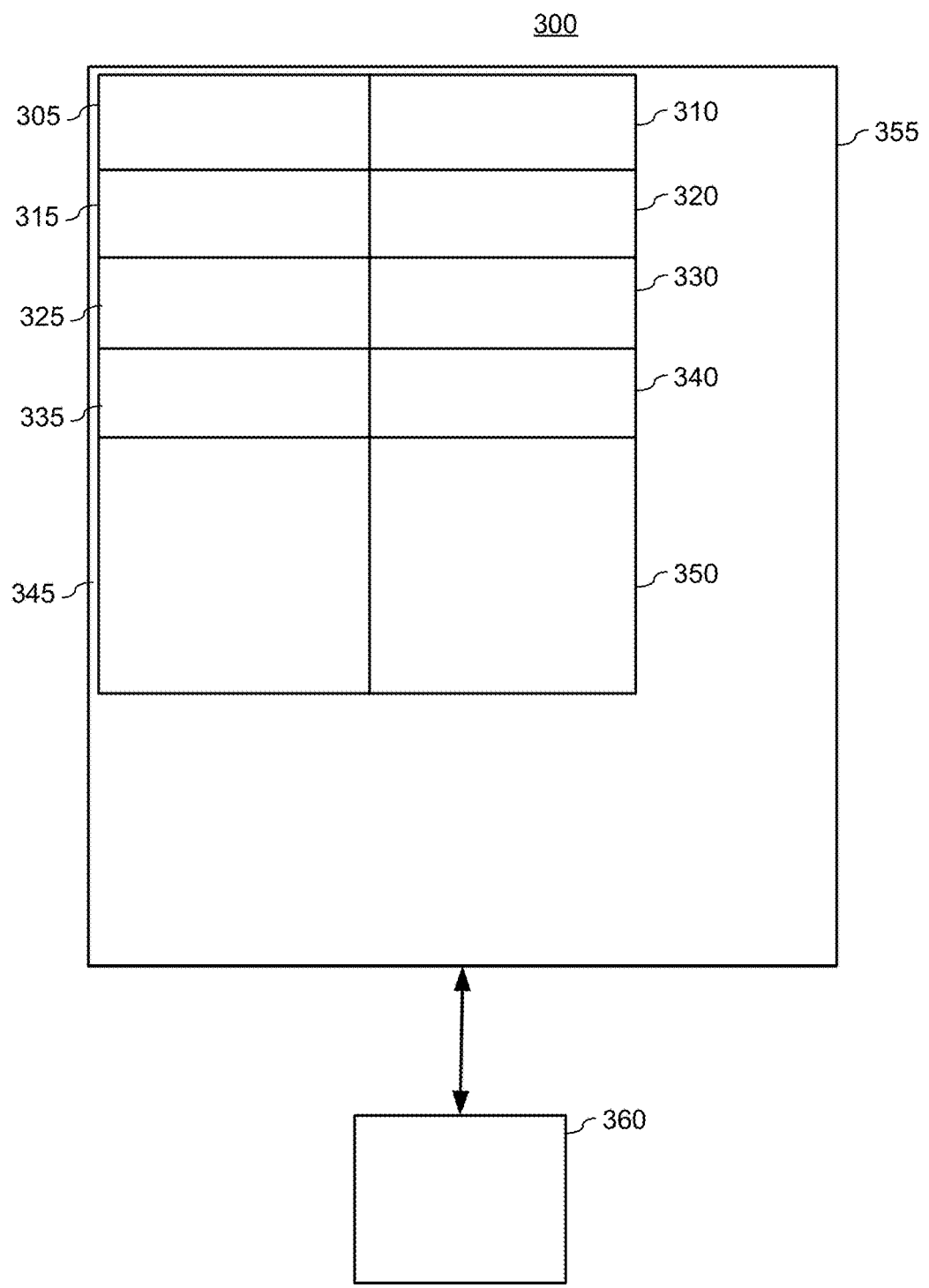
FIG. 3 depicts a block diagram of a switch including a MAC address table according to embodiments of the present invention.

FIG. 3 depicts a block diagram of a switch including a MAC address table according to embodiments of the present invention. FIG. 3 depicts switch 300. Switch 300 includes a memory 355 and a processor 360. Processor 360 can be any processor suitable for a switch, for example a processor manufactured by Broadcom such as BCM5365 or BCM5365P, a processor manufactured by Cisco such as RSP8 or RSP16, a processor manufactured by Marvell Technology Group, a processor manufactured by Atheros, or any other processor manufacture. One of ordinary skill in the art will understand that any processor that can be used in a switch can used for processor 360.

Processor 360 runs code that directs traffic as described above based on the MAC address table. Memory 355 includes a MAC address table. MAC address table includes a column for the port 305, 315, 325, 335, and 345. It also includes a column for the MAC address that has been learned and associated with a particular port 210, 220, 230, and 240. Each switch includes a MAC address table that associates a port and a particular MAC address.

Figure 4:
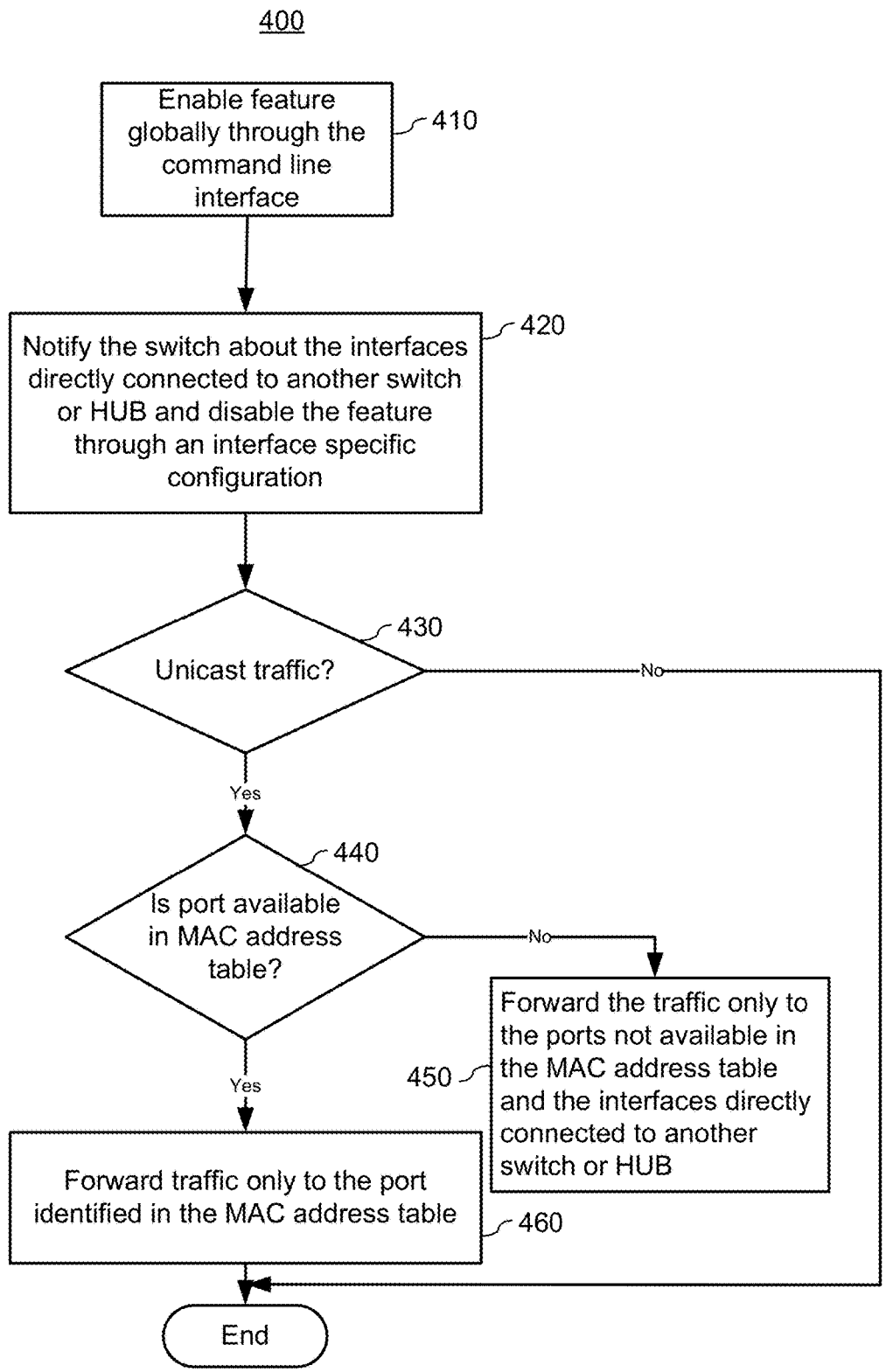
FIG. 4 depicts a flowchart used to implement switch traffic flow according to embodiments of the present invention.

FIG. 4 depicts a flowchart used to implement switch traffic flow according to embodiments of the present invention. FIG. 4 shows process 400 for implementing switch traffic flow according to embodiments of the present invention. FIG. 4 shows enabling the feature globally through the command line interface (CLI) 410. FIG. 4 also shows notifying the switch about the interfaces directly connected to another switch or HUB and disabling the feature through an interface specific configuration 420. Check if the traffic is unicast 430. If the traffic is broadcast or non-unicast, then embodiments of the present invention are inapplicable. If the traffic is unicast, then check if the destination port MAC address is available in the MAC address table 440. If the destination port is available in the MAC address table, then forward traffic only to the port identified in the MAC address table 460. If the destination port is not available in the MAC address table, then forward the traffic only to the ports not available in the MAC address table and the interfaces directly connected to another switch or HUB 450.

One advantage of the present invention is that bandwidth and processing time can be used more efficiently since the traffic is not broadcast or flood to every port.

One of ordinary skill in the art will appreciate that various benefits are available as a result of the present invention.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A switch system in a data communications network, comprising:
   a plurality of ports, each port capable of connecting to a device;
   a memory for storing a Media Access Control (MAC) address table comprising an association of a port and a MAC address; and
   a processor for directing traffic between ports, the processor configured to, in response to receiving at the switch system unknown unicast traffic associated with a domain:
   broadcast the unknown unicast traffic to each port that resides in a same broadcast domain and does not have a MAC address-port association in the MAC address table; and
   block or not broadcast the unknown unicast traffic to every port that resides in the same broadcast domain and has a MAC address-port association included in the MAC address table.

2. The switch system of claim 1 wherein the switch system is a layer two switch.

3. The switch system of claim 1 wherein the MAC address table resets after a predetermined period of time.

4. The switch system of claim 3 wherein the predetermined period of time is 300 seconds.

5. The switch system of claim 1 wherein the association of the port and MAC address is learned through prior communication traffic.

6. The switch system of claim 1 wherein the processor uses the MAC address table to block or not broadcast traffic to ports that are listed in the MAC address table.

7. A method for directing traffic in a data communication system, comprising:
- receiving traffic at a first port of the data communication system, the traffic having an unknown Media Access Control (MAC) address and being associated with a domain;
- in response to the traffic being unknown unicast traffic:
- broadcasting the unknown unicast traffic to each port that resides in a same broadcast domain and does not have a MAC address-port association in the MAC address table; and
- blocking or not broadcast the unknown unicast traffic to every port that resides in the same broadcast domain and has a MAC address-port in the MAC address table.

8. The method of claim 7 wherein at least a plurality of ports are not in the MAC address table.

9. The method of claim 7 wherein the data communication system is a layer two switch.

10. The method of claim 7 wherein the MAC address table resets after a predetermined period of time.

11. The method of claim 10 wherein the predetermined period of time is 300 seconds.

12. The method of claim 7 wherein the association of the port and MAC address is learned through prior communication traffic.

13. The method of claim 7 further comprising a processor that uses the MAC address table to block or not broadcast traffic to ports that are listed in the MAC address table.

14. A non-transitory computer readable medium or media comprising one or more sequences of instructions which, when executed by one or more processors, causes steps for directing traffic in a data communication system comprising:
- receiving traffic at a first port of the data communication system, the traffic having an unknown Media Access Control (MAC) address and being associated with a domain;
- in response to the traffic being unknown unicast traffic:
- broadcasting the unknown unicast traffic to each port that resides in a same broadcast domain and does not have a MAC address-port association in the MAC address table; and
- blocking or not broadcast the unknown unicast traffic to every port that resides in the same broadcast domain and has a MAC address-port in the MAC address table.

15. The computer readable medium of claim 14 wherein the data communication system is a layer two switch.

16. The computer readable medium of claim 14 wherein the MAC address table resets after a predetermined period of time.

17. The computer readable medium of claim 16 wherein the predetermined period of time is 300 seconds.

18. The computer readable medium of claim 14 wherein the association of the port and MAC address is learned through prior communication traffic.

19. The computer readable medium of claim 14 wherein the one or more processors use the MAC address table to block or not broadcast traffic to ports that are listed in the MAC address table.

* * * * *